United States Patent Office 3,155,740
Patented Nov. 3, 1964

3,155,740
HYDROGENATION OF OLEFINIC POLYMERS
Abraham Schneider, Overbrook Hills, Pa., assignor to Sun Oil Company, Philadelphia, Pa., a corporation of New Jersey
No Drawing. Filed May 28, 1962, Ser. No. 197,874
10 Claims. (Cl. 260—683.9)

This invention relates to a method of hydrogenating polymers of aliphatic monoolefins. The invention is applicable to the hydrogenation of any branched chain monoolefin polymers which have substantial solubility in aliphatic hydrocarbons. Examples of such polymers are liquid polypropylene such as the trimers, tetramers and other liquid polymers of propylene, polyisobutylene, polyoctene, ethylene-propylene copolymers and the like.

There are numerous procedures available in the art for polymerizing aliphatic olefins to unsaturated polymeric products and products ranging from liquid to solid polymers and including sticky or rubbery polymers have been prepared. For some intended uses it is desirable to hydrogenate the polymer product to remove the unsaturation. An example is in the use of lower polymers of propylene in gasoline manufacture, in which case hydrogenation of the polymers prior to incorporation in the gasoline will result in a better octane rating as determined by the Motor method. Another example is in the preparation of synthetic lubricating oils of high viscosity index. For this purpose propylene or higher olefins have been polymerized by means of various catalysts, such as aluminum chloride, a combination of an alkyl aluminum chloride and titanium tetrachloride or a peroxide type catalyst, to yield products of the lubricating oil range. It is desirable that these oils be hydrogenated before use as lubricants or as lubricant additives.

The present invention provides a method of hydrogenating branched chain olefinic polymers without the necessity of supplying free hydrogen to the system. Instead, one or more alkylcyclopentanes, as hereinafter specified, are used in a manner to serve as a hydrogen donor and provide the necessary hydrogen for saturating the polymer charge. As an additional benefit of the process, dimerization products of the alkylcyclopentanes are formed. These dimers are composed of polyalkyldecalins which can be separately recovered and utilized for various purposes.

According to the invention branched chain aliphatic monoolefin polymers are mixed with a saturate hydrocarbon stock which contains at least one alkylcyclopentane of the $C_6$–$C_{13}$ range and the mixture is contacted at a temperature in the range of $-30$ to $+50°$ C. with sulfuric acid having a strength of 88–100%. Under these conditions reaction occurs rapidly, whereby the olefinic polymers become hydrogenated to produce paraffinic hydrocarbons having the same number of carbon atoms per molecule as the original polymer. At the same time the alkylcyclopentane in the reaction mixture loses one hydrogen atom per molecule and the resulting intermediate undergoes self-alkylation to form polyalkyldecalins. After reaction the mixture is separated into an acid phase and a hydrogen phase from which the desired hydrogenated polymer and the polyalkyldecalins can be recovered.

The above-defined process can be used to hydrogenate any aliphatic monoolefin polymers provided that they have substantial solubility in the hydrocarbon phase of the reaction mixture and that the polymer molecules contain at least one branch on the polymer chain. With respect to the solubility requirement, most polyolefins are suitable charge materials unless their molecular weights are too high. The liquid polyolefins and generally those which are sticky or rubbery solids, such as atactic polypropylene and ethylenepropylene copolymers, can be hydrogenated by the present method. On the other hand high molecular weight, crystalline polypropylene does not have the necessary solubility characteristics.

Regarding the other requirement that the polymer contains at least one branch on the chain, this condition obtains for all polyolefins formed by polymerizing olefin monomers having three or more carbon atoms or by copolymerizing such olefins with ethylene regardless of whether the starting olefin is straight chain or branched. It may or may not apply for polymers obtained from polymerizing ethylene alone, depending upon the reaction conditions employed and whether or not isomerization occurs during the polymerization. In cases where the polyethylene molecules do have substantial branching that provides one or more tertiary carbon atoms in the polymer chain, the present process is applicable. The wide applicability of the present process to the hydrogenation of olefin polymers is a result of my discovery that any branched chain monoolefin polymer having the necessary solubility characteristics will undergo the desired reaction, regardless of the position of branches and location of the double bond in the molecule. Only a straight chain polymer will fail to be hydrogenated under the reaction conditions of the present process.

The reaction which occurs in the present process can be illustrated by the following equation using methylcyclopentane as the hydrogen donor:

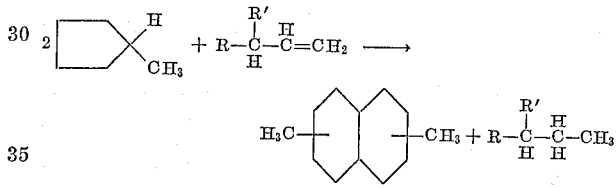

From this it can be seen that a hydrogen atom is transferred from each molecule of methylcyclopentane to the unsaturated polymer to yield the hydrogenated product, and at the same time the methylcyclopentane undergoes self-alkylation to produce dimethyldecalins. The hydrogenated product may or may not have the same structural configuration as the original polymer molecule, depending upon whether or not the R' group migrates along the polymer chain due to isomerization which may occur in the presence of the sulfuric acid catalyst. While in the equation the dimethyldecalins obtained are shown with the methyl groups positioned on opposite rings, these groups also can be on the same ring. In fact a majority of the dimethyldecalin isomers produced by the present process appear to have the two methyl groups attached to the same ring and some of these are gem compounds, i.e., with the two methyl groups attached to the same carbon atom. The dimethyldecalins also are substantially entirely isomers of the cis form.

The naphthene used as a reactant in the process must have a five membered ring which includes at least one tertiary carbon atom. Alkylcyclohexanes are not operative, nor are alkylcyclopentanes which do not contain a tertiary carbon in the ring such as 1,1-dimethylcyclopentane. The naphthene can have from 6 to 13 carbon atoms per molecule. Preferred naphthenes are methylcyclopentane and the dimethylcyclopentanes. These can be added to the reaction mixture as individual hydrocarbons or a mixtures which other hydrocarbons that are mainly inert under the reaction conditions, such as normal and isoparaffins and cyclohexanes. Saturate fractions of straight run petroleum of the $C_6$–$C_7$ range are suitable sources of the naphthene component, since these contain substantial amounts of methylcyclopentane and the dimethylcyclopentanes. Under the conditions of the process these naphthenes self-alkylate, dimerize or co-dimerize to yield polymethyldecalins of the $C_{12}$–$C_{14}$ range. The following are examples of other suitable naphthenes: ethylcyclopentane, methylethylcyclopentanes, diethylcyclopentanes, isopropylcyclopentane, tertiary butyl cyclopentane, tetramethylcyclopentanes, diisopropylcyclopentanes, triethylcyclopentanes, octylcyclopentanes and the like. The amount of the naphthene added to the reaction mixture should be at least two moles per mole of polymer. Preferably a substantially higher naphthene:polymer molar ratio is used, e.g., 4:1, and considerably higher ratios such as 10:1 can be used if desired. It is also preferable that the naphthene content of the material used to supply the naphthene be above 50 mole percent. Hence, when a straight run petroleum fraction is used as the source material, it should have been prepared under sufficiently efficient fractionating conditions to insure a relatively high alkylcyclopentane content. This can readily be done, for example, by distilling a methylcyclopentane concentrate from the $C_6$ fraction of petroleum. The presence in less than major amount of other saturate hydrocarbons of the same general boiling range, such as methylpentanes, n-hexane and cyclohexane, is not particularly detrimental to the desired reaction.

In carrying out the reaction a mixture of the alkylcyclopentane and the polymer, with or without other hydrocarbons that are mainly non-reactive being present, is contacted with sulfuric acid in a reaction zone provided with suitable agitating means for maintaining the mixture in the form of an emulsion. The temperature should be in the range of −30 to +50° C. Preferably a temperature of −10 to +10° C. is used to improve the selectivity of the self-alkylation reaction and obtain the best conversion of the alkylcyclopentanes to polyalkyldecalins as an additional benefit of the process. The reaction occurs practically immediately upon effecting intimate contact between the two phases. Hence a short reaction time, such as one minute, is generally adequate, although a longer reaction time such as 10 hours can be allowed if desired. Following the reaction the mixture is allowed to settle into a hydrocarbon phase and a lower acid phase which are separately removed. The hydrocarbon phase can then be fractionated to recover separately the hydrogenated polymer, the polyalkyldecalins formed and any unreacted alkylcyclopentane. The unreacted alkylcyclopentane and also the recovered acid phase can be recycled to the reaction zone for re-use.

The sulfuric acid fed to the reaction zone should have a strength of 88–100% $H_2SO_4$ by weight and more preferably 90–98%. Strength as here used is calculated on a hydrocarbon-free basis and relates to the proportion of $H_2SO_4$ to water present. Actually in an operation in which the acid is recycled, oily hydrocarbon material generally will build up therein but its presence is not taken into account in determining the acid strength. Preferably the amount of such hydrocarbon material in the acid fed to the reaction zone is maintained below 20% by weight. This can be done by removing a drag stream of acid and adding fresh sulfuric acid as make-up. The removed acid can be regenerated in any suitable manner and then fed back to the process.

The following examples illustrate the invention more specifically:

EXAMPLE I

The polymer used was propylene tetramer produced commercially by polymerizing propylene using a solid phosphoric acid catalyst. This material was composed essentially of $C_{12}$ branched olefins. A reactor provided with a stirrer was charged with the following:

40 ml. of 96% $H_2SO_4$ (72.3 g.)
10 ml. of methylcyclopentane (7.58 g., 0.090 mole)

While maintaining a temperature of about 2° C. and stirring the reactor contents, a solution of the tetramer (7.57 g., 0.0451 mole) in 15 ml. of methylcyclopentane (11.37 g., 0.135 mole) was slowly added over a time of 49 minutes, following which stirring was continued for 13 minutes more. The molar ratio of total methylcyclopentane to polymer used was approximately 3:1, and the proportion of polymer in the total hydrocarbon content of the mixture was about 28%. The mixture was then allowed to stratify and 25.9 g. of hydrocarbon layer separated from the acid layer. The latter was found to contain 0.5 g. of acid-soluble oil. Analysis of the hydrocarbon layer by vapor phase chormatography gave the results shown in Table I.

Table I

Composition of hydrocarbon layer, wt. percent:
  $C_4$ paraffins _____ 0.1
  $C_5$ paraffins _____ 0.2
  $C_6$ paraffins _____ 0.2
  Methylcyclopentane _____ 56.1
  $C_{12}$ paraffins (hydrogenated polymer) _____ 27.0
  Dimethyldecalins _____ 16.5

The molar yield of hydrogenated product based on the polymer charged was about 90%. Also the molar yield of dimethyldecalins, based on theoretical yield per mole of polymer charged, was about 57%. The presence of $C_4$–$C_6$ paraffins (mainly isoparaffins) in the product was due to the occurrence of a small amount of cracking.

EXAMPLE II

The present example illustrates the hydrogenation of a commercial propylene trimer produced by phosphoric acid polymerization. In this case the reaction mixture contained 3-methylpentane in addition to methylcyclopentane. The initial charge to the reactor was as follows:

40 ml. of 96% $H_2SO_4$ (72.3 g.)
10 ml. of 3-methylpentane (6.58 g., 0.0764 mole)
10 ml. of methlycyclopentane (7.62 g., 0.0906 mole)

To this mixture a solution of propylene trimer (5.67 g., 0.0449 mole (with 5 ml.) of 3-methylpentane (3.29 g., 0.0382 mole) and 5 ml. of methylcyclopentane was added over at time of 21 minutes while stirring at obout 0° C. The mixture was stirred for 4 minutes more and a sample, designated as Cut #1, was taken of the hydrocarbon layer. The mixture was then stirred at about 0° C. for 127 minutes more and Cut #2 was taken. After this the temperature was raised to 30° C., the mixture was stirred for 33 minutes more and Cut #3 was then taken. Compositions of the cuts as determined by vapor phase chromatography are shown in Table II. The acid layer obtained after separation of the phases contained 0.97 g. of acid-soluble oil.

Table II

|  | Cut #1 | Cut #2 | Cut #3 |
|---|---|---|---|
| Temperature, °C | 0 | 0 | 30 |
| Additional stirring, min | 0 | 127 | 33 |
| Composition of Cuts, wt. percent: | | | |
| $C_4$ paraffins | 0.1 | 0.1 | 0.1 |
| $C_5$ paraffins | 0.3 | 0.2 | 0.3 |
| $C_6$ paraffins | 42.4 | 43.7 | 42.8 |
| Methylcyclopentane | 33.0 | 31.1 | 31.5 |
| Intermediate boiling products | 1.4 | 1.6 | 1.5 |
| $C_9$ paraffins (hydrogenated polymer) | 14.7 | 14.7 | 14.8 |
| Dimethyldecalins | 7.4 | 7.8 | 8.3 |
| Higher boiling products | 0.9 | 0.9 | 0.7 |

The molar yield of $C_9$ paraffins per mole of polymer charged was about 66% and the molar yield of dimethyldecalins on the same basis was about 28%. The fact that these yields are lower than those shown in Example I is attributable to the presence of the 3-methylpentane which reduced the selectivity of the reaction.

The hydrogenated polymer products prepared as shown in the preceding examples have utility as gasoline blending stocks, jet fuels or special solvents. The dimethyldecalins produced are useful as chemical intermediates and also as jet fuels. These dimethyldecalins are a mixture of isomers which appear to be almost entirely of the cis form and boil above the trans isomers that can be obtained in other processes. The present dimethyldecalin product is unusual as compared to mixed dimethyldecalins prepared in other ways, in that none of its components will crystallize from the mixture at −80° C. Also the present product, being essentially cis isomers, has a higher density than other dimethyldecalin mixtures and hence will provide more energy per unit volume. Both of these characteristics are highly desirable with respect to use of the dimethyldecalins as fuel for pet engines.

When other monoolefin polymers, such as polybutylenes, polyoctene oils, ethylene copolymers with other olefins and the like, are used as starting material or when other $C_6-C_{13}$ alkylcyclopentanes are substituted for methylcyclopentane, analogous results are obtained.

I claim:

1. Method of hydrogenating branched chain polymers of aliphatic monoolefins which polymers have substantial solubility in aliphatic hydrocarbons which comprises contacting an admixture of such polymers and a saturate hydrocarbon stock containing at least one alkylcyclopentane of the $C_6-C_{13}$ range containing at least one tertiary carbon atom in the cyclopentyl ring at a temperature in the range of −30 to +50° C. with sulfuric acid having strength of 88–100%, separating the mixture into an acid phase and a hydrocarbon phase, and recovering from the hydrocarbon phase hydrogenated product having the same number of carbon atoms as the original unsaturated polymers.

2. Method according to claim 1 wherein a dimerization product of said alkylcyclopentane is also recovered from the hydrocarbon phase.

3. Method according to claim 1 wherein said alkylcyclopentane is methylcyclopentane.

4. Method according to claim 3 wherein dimethyldecalin is recovered from the hydrocarbon phase.

5. Method according to claim 1 wherein said temperature is in range of −10 to +10° C.

6. Method according to claim 5 wherein said strength of sulfuric acid is 90–98%.

7. Method of hydrogenating liquid polymers of propylene having at least nine carbon atoms per molecule, which comprises contacting an admixture of such polymers and a saturated hydrocarbon stock containing at least one naphthene selected from the group consisting of methylcyclopentane and dimethylcyclopentanes in which the methyl groups are attached to different carbon atoms at a temperature in the range of −30 to +50° C. with sulfuric acid having a strength of 88–100%, separating the mixture into an acid phase and a hydrocarbon phase, and recovering from the hydrocarbon phase hydrogenated product having the same number of carbon atoms as the original unsaturated polymers.

8. Method according to claim 7 wherein polymethyldecalin of the $C_{12}-C_{14}$ range formed by dimerization of said naphthene is also recovered from the hydrocarbon phase.

9. Method according to claim 7 wherein said temperature is in the range of −10 to +10° C. and said strength of sulfuric acid is in the range of 90–98%.

10. Method according to claim 7 wherein said saturate hydrocarbon stock is a fraction of straight run petroleum boiling in the $C_6-C_7$ range.

References Cited in the file of this patent

UNITED STATES PATENTS

| | | |
|---|---|---|
| 2,721,832 | Draeger | Oct. 25, 1955 |
| 3,080,436 | King et al. | Mar. 5, 1963 |

OTHER REFERENCES

Kalkchevsky et al.: "Petroleum Refining with Chemicals," Elsevier Publishing Company, New York, 1956, page 74, second full paragraph.